(12) United States Patent
Delmonico et al.

(10) Patent No.: US 9,068,294 B2
(45) Date of Patent: Jun. 30, 2015

(54) METHODS FOR REPAIR AND PREVENTIVE MAINTENANCE OF RAILROAD TIES USING UV CURABLE POLYMERS

(75) Inventors: Douglas Delmonico, Broomfield, CO (US); Fabian Weber, Boulder, CO (US)

(73) Assignee: Encore Rail Systems, Inc., Chicago, IL (US)

( * ) Notice: Subject to any disclaimer, the term of this patent is extended or adjusted under 35 U.S.C. 154(b) by 600 days.

(21) Appl. No.: 13/202,711

(22) PCT Filed: Feb. 19, 2010

(86) PCT No.: PCT/US2010/000485
§ 371 (c)(1),
(2), (4) Date: Oct. 21, 2011

(87) PCT Pub. No.: WO2010/096182
PCT Pub. Date: Aug. 26, 2010

(65) Prior Publication Data
US 2012/0049416 A1    Mar. 1, 2012

Related U.S. Application Data

(60) Provisional application No. 61/208,146, filed on Feb. 20, 2009.

(51) Int. Cl.
| B05D 3/00 | (2006.01) |
| C08J 7/18 | (2006.01) |
| E01B 31/20 | (2006.01) |
| C09D 163/10 | (2006.01) |
| C08F 2/48 | (2006.01) |

(52) U.S. Cl.
CPC .............. *E01B 31/20* (2013.01); *C09D 163/10* (2013.01); *C08F 2/48* (2013.01)

(58) Field of Classification Search
CPC ........................................................ E01B 31/20
USPC ........ 104/2, 9, 10, 16; 238/27, 121, 266, 267, 238/270, 280, 283; 427/136, 140, 142, 427/207.1, 532, 553, 595; 52/514, 741.4, 52/741.41, 742.13
See application file for complete search history.

(56) References Cited

U.S. PATENT DOCUMENTS

| 4,156,440 | A | | 5/1979 | Katoh et al. | |
| 4,507,444 | A | * | 3/1985 | Slawyk et al. | 525/455 |
| 4,742,147 | A | * | 5/1988 | Nichols | 528/75 |
| 5,173,222 | A | * | 12/1992 | Young et al. | 264/35 |
| 7,267,881 | B2 | * | 9/2007 | Weberg et al. | 428/447 |
| 2005/0025903 | A1 | * | 2/2005 | Fink et al. | 427/521 |
| 2005/0098648 | A1 | | 5/2005 | McQueen | |
| 2005/0196605 | A1 | | 9/2005 | Ramsey | |
| 2007/0040293 | A1 | | 2/2007 | Lane et al. | |
| 2008/0193785 | A1 | | 8/2008 | Kingma et al. | |
| 2008/0235929 | A1 | * | 10/2008 | Stolarczyk et al. | 29/402.04 |
| 2009/0301027 | A1 | * | 12/2009 | Pelletier et al. | 52/741.4 |
| 2011/0206867 | A1 | | 8/2011 | Delmonico et al. | |

OTHER PUBLICATIONS

U.S. Appl. No. 12/660,057 (Publ'n. No. 2011/0206867), Office Action dated Mar. 9, 2012.

* cited by examiner

*Primary Examiner* — Michael Wieczorek

(57) ABSTRACT

A method for repair and preventive maintenance of railroad ties by application of a polymer system to the surface of the rail seat. The polymer system is cured by irradiation with ultraviolet light to fully cure or partially cure the polymer. The polymer system may be used in conjunction with a tie pad that is capable of transmitting ultraviolet light to permit curing of the polymer.

8 Claims, 2 Drawing Sheets

METHODS FOR REPAIR AND PREVENTIVE MAINTENANCE OF RAILROAD TIES USING UV CURABLE POLYMERS

BACKGROUND

The modern railway consists of steel rails secured on top of sleepers or cross-ties. Cross-ties or ties are often constructed from wood or concrete. When concrete ties are used on a railway it is common practice to use a multi-part plastic or plastic composite tie pad between the base of the steel rail and the concrete tie. The intended function of this tie pad is to mitigate the impact forces of rail traffic to prevent damage to the concrete tie. An inward angle is engineered into the concrete tie and is referred to as the "cant". The purpose of the cant is to angle the rails to counteract the load moment created on the tie by the train load, which is transmitted through the rails into the tie. The cant is usually cast into the geometry of concrete ties.

Over time the surface of the concrete beneath the tie pad wears out and the concrete can abrade. This wear, termed rail seat abrasion, is a common occurrence for railroads that handle heavy tonnage freight and in geographic areas prone to higher levels of moisture. Rail seat abrasion can occur in other areas of high track loadings such as in curved track or where steep grades are present. Severe rail seat abrasion can compromise the effectiveness of fasteners used to secure the steel rails to the concrete cross tie. The diminished effectiveness of the rail fasteners leads to an unsafe condition, possibly resulting in train derailment.

Modern day concrete tie repair techniques and preventive maintenance involve removing the steel rail and tie pads then applying an epoxy or other polymer material to build up the worn area. These materials are weather sensitive and the cure times for them to harden enough to allow the rail to be put back on can be from 5 to 30 minutes or longer. Once the polymer has cured, a new tie pad is placed on the tie seat (rail seat) area of the concrete tie, then the steel rail is replaced. It has become a standard for all class one railroads to repair tie seat abrasion when replacing a worn (steel) rail, which is usually done one quarter mile at a time. While maintenance work is being done to the rail the railway must be taken out of service, resulting in train traffic scheduling issues and train delays. The time spent by maintenance crews to repair the ties results in huge train delays and lost revenue from the delays. Most railroads today operate as scheduled railroads which means trains need to get from point A to point B in a predetermined time. Delays for maintenance procedures like this however, necessarily cause problems for the transportation departments of the railroads.

SUMMARY OF THE INVENTION

The present invention is directed to a method for repair and preventive maintenance of railroad ties, comprising the steps of: providing a UV curable polymer composition or system; applying the UV curable polymer system to the rail seat of the railroad tie; and polymerizing the UV curable polymer system by irradiation with ultraviolet light.

In another embodiment, the shape of the rail seat of the tie can be changed by the steps of: installing a tie pad capable of transmitting ultraviolet light on the rail seat to form a mold cavity between the tie pad and rail seat, the rail seat having a first shape; applying a UV curable polymer system within the mold cavity; and curing the UV curable polymer system by irradiation with ultraviolet light to form a surface on the rail seat having a second shape different from the first shape.

BRIEF DESCRIPTION OF THE DRAWINGS

FIG. 3b is a side view of the manifold of FIG. 3a.

FIG. 3c is a bottom view of the manifold of FIG. 3a

DETAILED DESCRIPTION OF THE INVENTION

Figure 1:
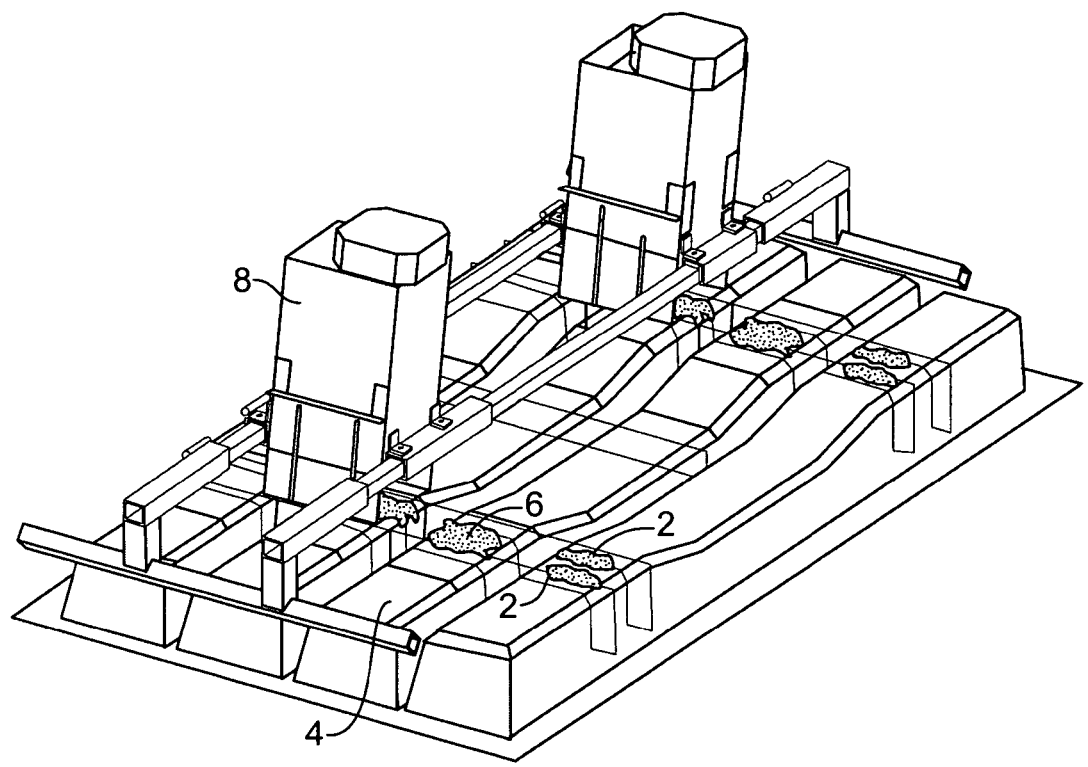
FIG. 1 shows the application of a UV curable polymer system to the rail seat of a railroad tie and subsequent irradiation with ultraviolet light according to an embodiment of the method of the present invention.

The onset of rail seat abrasion is offset by bonding an epoxy or other polymer to the rail seat area during the tie pad replacement procedure, this is a common practice for all heavy freight railroads using concrete ties today. This can also be done at the concrete tie manufacturing facilities in a secondary operation after the ties have been removed from their forms' molding cavities.

In both situations, pre-use and after being placed in service, the useable lifetime of concrete ties is increased by bonding an engineered polymer, typically an epoxy, but other materials such as polyurethanes and polyureas have been successfully used to accomplish increased service life of concrete ties. Conventional practice is to use a multiple component liquid compound that chemically reacts when mixed just prior to application to the tie eventually curing, hardening, in place on the tie seat area of the concrete tie. This process both when used prior to service and once the tie has been placed in service, are limited by the chemical reaction times, ambient temperatures, and various set times of the different coatings.

Most railroads require regular maintenance of these railroad track components to insure the track structure will not be the cause of a derailment. The maintenance intervals are dependant on several factors including rail traffic frequency, freight tonnage, speeds of travel and geographic locations. Weather, track incline, track curvature, roadbed stability also play a part as to when maintenance of this type is required. The extensive network of railways and the increased tonnage the railroads are handling require that maintenance operations take place year round in the full range of ambient temperatures. With respect to the process within this invention a key factor is the range of ambient temperature in which maintenance operations are or can be conducted. Since conventional polymer systems rely chiefly on chemical reactions to cure and the relationship of those cure times being directly influenced by ambient temperatures, the speed at which these conventional materials cure is directly influenced by ambient temperature. When the concrete tie is cold the curing times can exceed 30 minutes, therefore requiring a significant amount of dwell time prior to the subsequent maintenance operation and eventual return to normal train traffic.

In the case of polymeric coating of concrete ties prior to being placed into service where the ties are coated at concrete tie manufacturing facilities, or in a secondary operation in another location, the polymer cure cycle in order to provide a consistent process must be accomplished in a controlled environment, typically either within a building or within an adequate structure to provide protection from local climate influences. In this situation cure cycle duration directly influences overall process velocity, physical space, and therefore working capital.

As stated, conventional coating processes, applied to both new and in service railroad ties, are constrained by the required time for the polymer resins to set. By incorporating ultraviolet (UV) curable polymer system comprising a photoinitiator capable of absorbing UV energy from a light source, and using an ultraviolet light source as the primary reaction mechanism, this process will either fully cure the repair material or cure the repair material to a state where the next step in the process can be conducted, within seconds versus 20 to 40 minutes as required for conventional methods, thereby significantly diminishing the temperature and time constraints for the polymeric cure cycle. In the case where the material is partially cured via photoinitiation, a secondary chemical reaction will complete the cure process.

The repair of mild rail seat abrasion or preventive maintenance to retard the onset of rail seat abrasion may be accomplished by the application of a relatively thin coating of polymer, typically about 3/16 of an inch or less. In a preferred embodiment, a 2 part epoxy system is used that is mixed just prior to applying to the tie. In an alternative embodiment, a 1 part polymer system or other mixes may be used. The UV curable polymer system preferably contains a photoinitiator that absorbs light in the near visible portion of the ultraviolet spectrum, and most preferably in a range of about 300 nm to about 450 nm. In one embodiment, a 1-part polymer system may be used, wherein UV-C light is used to cure the surface and UV-A or UV-B light is used to provide curing within the polymer system.

The polymer system may be applied using a variety of means, including pouring, brushing, rolling, spraying and troweling, as are known in the art. In a preferred embodiment, the polymer system is applied via a commercially available spray or atomizing dispensing device. Then, an ultraviolet light source is used to irradiate the freshly applied polymer to fully cure or partially cure the polymer to a state where the next process in the process can be applied.

The polymer system may include one or more additives to adapt the viscosity of the polymer system to the specific application. In a preferred embodiment, such additives are thixotropic agents which cause the polymer system to exhibit different viscosities when subject to shear stress than when at rest. For example, the polymer system may be relatively free flowing during application, but increase in viscosity once applied to the railroad tie to reduce sagging and dripping before curing. Thixotropic agents are well known in the art and include additives such as fumed silica.

An epoxy acrylate polymer system having a viscosity of about 600 cps at 75° F. was found to be suitable for application to the tie surface by brushing, such as by using a paint brush. At this viscosity, the epoxy flowed rapidly and dispersed on the tie to form a very even coating, with a depth of about 0.024 inches. Coatings of this thickness have been found to be useful for purposes of preventive maintenance, and are sufficiently thick to provide protection from the onset of rail set abrasion without being so thick as to interfere with the operation of the fastener that secures the rail to the tie. The temperature of the process was maintained below 120° F. to prevent the acrylates from hardening.

For applications where high production velocities are required, it may be desirable to use polymer systems having thinner viscosities that are more easily sprayed. Higher viscosity formulations may be desirable for applications that require relatively thick coatings. Such thick coatings may also be achieved using a permanent, temporary or disposable barrier or form to maintain the polymer system in place on the tie until the polymer can be UV cured. Alternatively, a thick coating may be built up from the successive application and curing of multiple polymer layers.

In some cases, the polymer system may be sufficiently viscous to permit a single application to hold its shape until it is UV cured. For example, it has been found that epoxy systems having a viscosity of about 24,500 cps are useful for the repair of wear on track where the ties are highly canted. Such formulations are sufficiently viscous to permit the epoxy system to maintain its position on the canted surface until it can be UV cured.

The ultraviolet light source may be an arc lamp, such as a mercury or xenon lamp, laser or other ultraviolet light source known in the art. Although, in some conditions, sunlight may be capable of providing UV irradiation for curing in the case of lamp malfunction, it is not practical as a primary source of UV illumination due to the limited power levels in the desired spectrum and variations in ambient conditions, such as fluctuations in light level based on time of day, atmospheric conditions, and geographic and other line of sight barriers.

In a preferred embodiment, a microwave powered electrode-less arc lamp is used as the ultraviolet light source, which provides sufficiently high output to achieve desired cure without risk of premature cure due to stray illumination from sunlight. In general, it is desirable for the light source or sources to have a UV output in the range of about 200 nm to about 450 nm, to ensure curing of the surface and within the applied polymer layer. An example of a suitable UV lamp system comprises an 1300 MB lamp unit with an integral blower and "D" bulb connected to a P300MT power supply (Fusion UV Systems, Inc.—Gaithersburg, Md.). "D" bulbs are reported by the manufacturer to have variable output across the UV spectrum, with a relatively high output in the UV-A range, which is effective in penetration of epoxy polymer systems and, therefore, curing within the applied layer. According to the manufacturer, the output spectrum of the "D" bulb is approximately 1/3 ultraviolet, 1/3 visible, and 1/3 infrared, each about 600 watts.

The lamp is preferably positioned vertically above the tie and is configured to illuminate the entire tie seat when positioned under the center of the lamp and there is no relative movement between the lamp and the tie. A diffusing deflector may be installed in the lamp system to help distribute the irradiation evenly and, therefore, fully cure the entire tie seat area in the minimum time.

The conditions of irradiation—e.g., the height of the lamp above the tie seat and the length of time for irradiation—are generally selected to minimize the cure time. However, consideration must be given to avoid generating surface temperatures that are too high and would melt the cured epoxy. In a preferred embodiment, the bottom of the lamp housing is positioned approximately 4.5 inches above the tie seat. This distance is found to allow sufficient air flow from the integral fan of the lamp unit, such that no adverse effects are observed on the epoxy for irradiation times of at least as long as 30 seconds. Under these conditions, an epoxy layer of 1/8th inch or less was found to be cured in less than about 5 seconds.

In an alternative embodiment, the ultraviolet light source is an LED array having a narrow band emission spectrum that closely matches the optimized spectral requirements of the photo initiator(s) contained in the polymer system. The use of an LED light source has several advantages to other UV light sources such as mercury arc lamps and microwave powered mercury arc lamps. These advantages include narrow band wavelength emission, reduced overall power consumption, rapid power cycling, increased ruggedness, useable life, personnel and environmental safety concerns from possible exposure to mercury, microwaves and the high voltages required to power these devices.

The next step would depend on whether the ties are being coated prior to being put into service, such as in a finishing step during their manufacture or in a rail maintenance scenario where the rail and/or pads are being replaced after being put into service. For the case where more severe rail seat abrasion is being repaired, often seen in curved track where higher tangential track reaction loads are present, a thicker coating of epoxy will have to be applied. In this case, and possibly in the mild abrasion or preventive cases, maintaining or re-establishing the rail cant, a predetermined angle cast into new tie seats may be required. This may accomplished by installing the new rail seat (tie) pad just after the epoxy is applied. This pad must be able to transmit the required ultraviolet spectrum or other near ultraviolet emission, to initiate cure of the polymer system without itself incurring significant degradation. In a preferred embodiment, the tie pad is sized and shaped to reference portions of the concrete tie not affected by wear as datum surfaces. This will allow the pad to act as a partial mold cavity used to form the upper surface of the repaired tie seat. The areas of the tie pad which contact the already applied but still viscous epoxy, now sandwiched within the mold cavity formed between the abraded concrete tie and the tie pad, re-form, or maintain, the proper shape and cant of the original, unworn surface of the rail seat. This same technique can possibly be used to alter the shape of the rail seat and/or rail cant should that become necessary. In an alternative embodiment, the tie pad is placed on the tie seat and the viscous polymer system is injected below or through the tie pad to fill the space or mold cavity formed between the tie and the tie pad.

Once the new tie pad is applied and pressed into place with sufficient force to flow the still viscous polymer system such that the surface of the tie pad is in its proper location, the ultraviolet, or near ultraviolet radiation process can be initiated to begin cure of the polymer system.

Figure 3A:
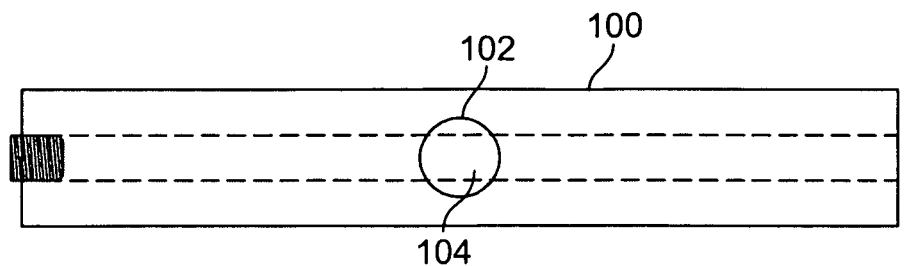
FIG. 3a is top view of a manifold for dispensing a UV curable polymer system, according to an embodiment of the present invention.
Figure 3B:
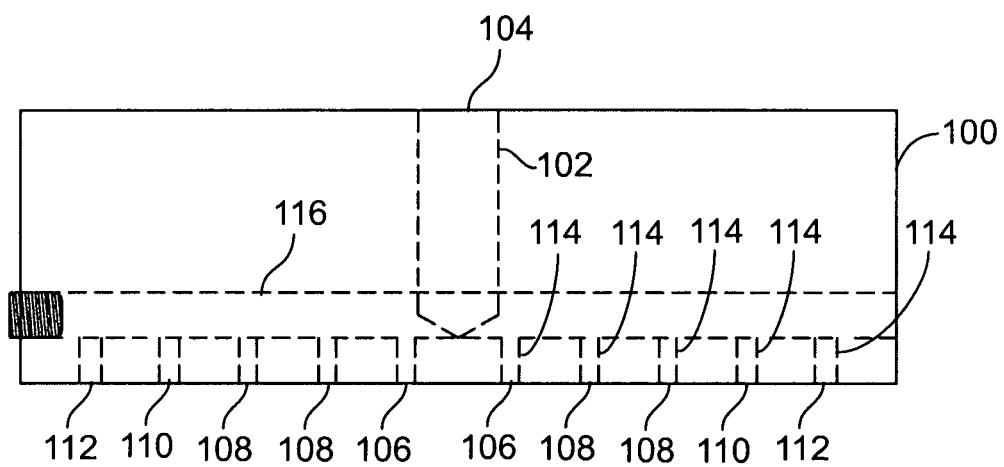
Figure 3C:
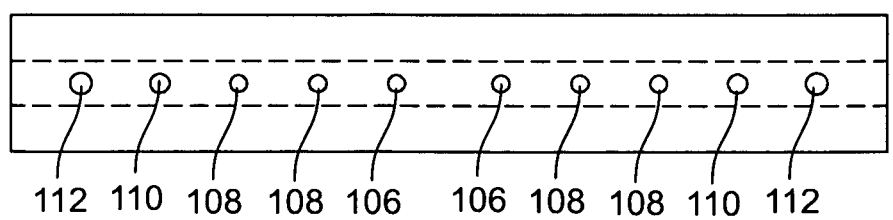

The application of the polymer system to the ties may be automated. In one embodiment, a low viscosity polymer system may be dispensed onto the ties as streams of liquid from a fabricated manifold having a set of spaced openings. FIG. 3 shows an example of a suitable manifold 100. A bore 102 with an opening 104 is provided for feeding the polymer system into manifold 100. The polymer system is dispensed from manifold 100 through channels 114 with openings 106, 108, 110 and 112. Channels 114 are connected by a main channel 116 that is connected to bore 102. The manifold may be made of a variety of materials known in the art, including metal or plastic. In a preferred embodiment, the manifold is made of a high density polyethylene plastic.

Those of skill in the art will appreciate that the pressure of the polymer system in the manifold is typically greatest close to bore 102 and decreases as it travels farther away from the bore. Thus, to ensure that the polymer system is evenly dispensed across the manifold, it is preferred that openings 106, 108, 110 and 112 increase in size as they are positioned further away from bore. In addition, it is desirable to avoid positioning an opening directly in line with bore 102, where the pressure is greatest. For the same reasons, the spacing between openings 106 closest to bore 102 is typically greater than the spacing between other openings.

The preferred dimensions of the manifold will vary according to the application and viscosity of the polymer system. In one embodiment, manifold 100 has the approximate dimensions 1"×2"×6¼", with a main channel 116 and bore 112 having circular cross-sections that are approximately 5/16" and 37/64" in diameter, respectively. Circularly-shaped openings 106, 108, 110, 112 have respective diameters of approximately ⅛", ⅛", 9/64" and 5/32", with correspondingly sized and shaped channels 114. The spacing between adjacent openings is approximately 9/16" between centers, except that the spacing between openings 106 is approximately ¾".

Manifolds having the dimensions described above are found to be suitable for dispensing polymer systems having viscosities between about 1000 cps to about 2000 cps. As shown in FIG. 1, the dispensed polymer forms a series of parallel tracks 2 on the surface of the ties 4 that subsequently flow together after a short time to create an even coating 6. A UV lamp(s) 8 then passes over the coating and cures the polymer.

The automated application of polymer coatings can also be incorporated into the manufacturing process for concrete ties. Newly cast and de-molded concrete ties typically have a high moisture content. Therefore, it is often necessary to remove any surface water from the ties before applying the polymer system. For example, an air knife system may be used to blow off any surface water and remove any dust and debris from the surface of the tie before application of the polymer.

Figure 2:
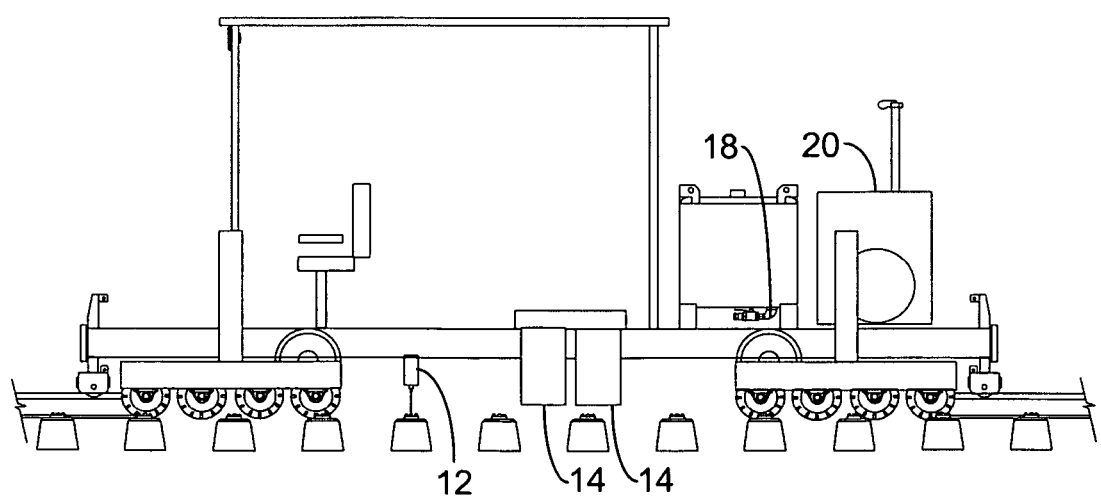
FIG. 2 is a side view of mobile equipment for the application and UV irradiation of a UV curable polymer system on railroad ties in on-site railway repair and maintenance operations, according to an embodiment of the present invention.

The automated process can also be incorporated into mobile equipment for use in on-site railway repair and maintenance operations. Referring to FIG. 2, an example of mobile equipment 10 for on-site railway maintenance is shown, having as its main components an epoxy applicator 12, a UV light source(s) 14, a storage container 16 for the polymer system, a pumping system for the polymer 18, and a power source 20. In addition, the equipment is provided with means for traveling on or along a railway with at least one rail removed. An example of a suitable means for traveling along a railway with one rail missing is provided by the moveable crawler system of U.S. patent application Ser. No. 11/999,699, which is hereby incorporated by reference. The mobile equipment may also incorporate additional subsystems to assist in related processes, as are known in the art.

The use of a UV curable polymer system provides numerous advantages, including, build up of a wear resistant polymeric surface on a concrete tie, establishment of the proper tie (rail) cant, and significant improvement in the speed of the cure process of the polymeric tie coating. These advantages are also obtained when the UV curable polymer system is being used with or without tie pads, and when thin coatings are used both prior to ties being put into service and when thin applications are done to concrete ties already in service in existing track.

While various embodiments have been described, it will be apparent to those of ordinary skill in the art that many more embodiments and implementations are possible within the scope of the invention.

What is claimed is:

1. A method for repair and preventive maintenance of railroad ties, comprising the steps of:
   providing a railroad tie having a rail seat;
   providing a UV curable polymer system;
   applying the UV curable polymer system to the rail seat;
   installing a tie pad capable of transmitting ultraviolet light over the UV curable polymer system applied to the rail seat; and
   curing the UV curable polymer system by irradiation with ultraviolet light through the tie pad.

2. The method of claim 1, wherein the UV curable polymer system is applied to the rail seat after the tie pad is installed.

3. The method of claim 2, wherein the UV curable polymer system is applied by injection through the installed tie pad.

4. The method of claim 1, wherein the installed tie pad forms a mold cavity with the rail seat for shaping the UV curable polymer system applied to the rail seat.

5. The method of claim 4, wherein the railroad tie has a first cant and the UV curable polymer system is shaped having a second cant different from the first cant.

6. A method for changing the shape of the rail seat of a railroad tie, comprising the steps of:
   providing a railroad tie having a rail seat with a first shape;
   installing a tie pad on the rail seat to form a mold cavity between the tie pad and rail seat, the tie pad capable of transmitting ultraviolet light;
   applying a UV curable polymer system on the rail seat, within the mold cavity; and
   curing the UV curable polymer system by irradiation with ultraviolet light through the tie pad to form a surface having a second shape different from the first shape.

7. The method of claim 6, wherein the railroad tie has a first cant and the UV curable polymer system is cured to form a surface having a second shape with a second cant different from the first cant.

8. The method of claim 6, wherein the UV curable polymer system is applied by injection through the tie pad.

* * * * *